US012601393B2

(12) United States Patent
Wirtz et al.

(10) Patent No.: US 12,601,393 B2
(45) Date of Patent: Apr. 14, 2026

(54) ACTUATOR

(71) Applicant: AUMA Riester GmbH & Co. KG, Müllheim (DE)

(72) Inventors: Anna Wirtz, Wenden (DE); Benjamin Hofmann, Heitersheim (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 45 days.

(21) Appl. No.: 18/721,452

(22) PCT Filed: Oct. 7, 2022

(86) PCT No.: PCT/EP2022/077880
§ 371 (c)(1),
(2) Date: Jun. 18, 2024

(87) PCT Pub. No.: WO2023/117169
PCT Pub. Date: Jun. 29, 2023

(65) Prior Publication Data
US 2025/0060027 A1 Feb. 20, 2025

(30) Foreign Application Priority Data
Dec. 23, 2021 (DE) ..................... 10 2021 134 550.2

(51) Int. Cl.
*F16H 35/00* (2006.01)
*F16H 19/08* (2006.01)
(Continued)

(52) U.S. Cl.
CPC ............. *F16H 35/00* (2013.01); *F16H 19/08* (2013.01); *F16H 57/029* (2013.01);
(Continued)

(58) Field of Classification Search
CPC ........ F16H 35/00; F16H 19/08; F16H 57/029; F16H 57/031; F16H 2057/02026; F16H 2057/02073; F16K 31/53
See application file for complete search history.

(56) References Cited

U.S. PATENT DOCUMENTS

| | | | |
|---|---|---|---|
| 431,994 A * | 7/1890 | Reed ....................... | F16H 35/00 74/43 |
| 4,647,007 A | 3/1987 | Bajka | |

(Continued)

FOREIGN PATENT DOCUMENTS

| | | |
|---|---|---|
| CN | 211779270 U | 10/2020 |
| CN | 112049977 A | 12/2020 |

(Continued)

OTHER PUBLICATIONS

DE103 22 832 A1—Machine Translation (Year: 2004).*

*Primary Examiner* — Jake Cook
(74) *Attorney, Agent, or Firm* — Volpe Koenig

(57) ABSTRACT

An actuator (1) including an engageable manual drive shaft (2) for the manual drive and a manual operating element (3), wherein the manual operating element (3) can be detachably connected to a housing (4) of the actuator (1). The manual operating element (3), in a position connected to the housing (4), forces the coupling of the manual drive shaft (2) to a gear (5) of the actuator (1). Also shown is an actuator (20) including a stacked structure (15) arranged in a housing (4) and a connecting element (21) for connecting the stacked structure (15) to the housing (4), wherein the connection between the housing (4) and the stacked structure (15) has an axial degree of freedom.

13 Claims, 6 Drawing Sheets

(51) Int. Cl.

| | |
|---|---|
| *F16H 57/02* | (2012.01) |
| *F16H 57/029* | (2012.01) |
| *F16H 57/031* | (2012.01) |
| *F16K 31/53* | (2006.01) |

(52) U.S. Cl.
CPC . *F16H 57/031* (2013.01); *F16H 2057/02026* (2013.01); *F16H 2057/02073* (2013.01); *F16K 31/53* (2013.01)

(56) References Cited

U.S. PATENT DOCUMENTS

| | | | |
|---|---|---|---|
| 4,759,386 A | | 7/1988 | Albert, III |
| 5,035,269 A | * | 7/1991 | Pytryga ................. F17C 13/085 |
| | | | 414/490 |
| 5,295,907 A | | 3/1994 | Akkerman |
| 5,921,527 A | | 7/1999 | Ikawa et al. |
| 6,084,370 A | | 7/2000 | Moeller |
| 2016/0380509 A1 | | 12/2016 | Crites et al. |
| 2018/0283574 A1 | | 10/2018 | Volovec |

FOREIGN PATENT DOCUMENTS

| | | | |
|---|---|---|---|
| DE | 10322832 A1 | 12/2004 | |
| EP | 1646817 A1 | 4/2006 | |
| WO | 2011063904 A1 | 6/2011 | |

* cited by examiner

16

ACTUATOR

CROSS-REFERENCE TO RELATED APPLICATIONS

This application is a 371 National Phase of International Application No. PCT/EP2022/077880, filed Oct. 7, 2022, which claims priority from German Patent Application No. 10 2021 134 550.2, filed Dec. 23, 2021, both of which are incorporated herein by reference as if fully set forth.

TECHNICAL FIELD

The invention relates to an actuator, in particular an actuator having an engageable manual drive shaft for manual drive and an actuator comprising a stacked structure arranged in a housing.

BACKGROUND

Actuators are used, among other things, to actuate fittings and/or valves. With this type of actuator, it may be necessary to be able to manually operate the actuator on site, in particular for emergency operation of the actuator in the event of failure of a drive unit of the actuator, for example an electric motor.

In known actuators of the type mentioned at the beginning, for example, a handwheel is formed on a shaft for the manual drive, which can be brought into the flow of force or torque to the drive shaft using a coupling device. However, such coupling devices often have a complicated and/or fault-prone design.

Furthermore, actuators of the type mentioned at the beginning often comprise stacked structures within the housing of the actuator. The stacked structures can include functional elements of the actuator, such as motors for the drive or coupling means for the manual drive of the actuator. A secure connection between the stacked structure and the housing is necessary, in particular to prevent damaging or disruptive (vibration) movements of the stacked structure relative to the housing. However, known connections have to be made in a complicated way and within rigid tolerance limits that are incompatible with changes to the stacked structure during the manufacturing process and/or during use of the actuator. This can complicate the manufacturing process and lead to malfunctions or damage during use of the actuator.

SUMMARY

It is therefore the object of the invention to provide an improved actuator, in particular to create an actuator whose manufacture and handling is simplified.

The solution to this problem in the actuator of the type mentioned at the beginning consists in particular in that the actuator with a engageable shaft for manual operation comprises a manual operating element, wherein the manual operating element can be detachably connected to a housing of the actuator, and wherein the manual operating element, in a position connected to the housing, forces the coupling of the manual drive shaft to a gear of the actuator, in particular wherein the manual operating element, in the position connected to the housing, is coupled directly or indirectly to the manual drive shaft.

The gear of the actuator is, for example, a (main) drive gear that can be driven by a motor, in particular by an electric motor of the actuator. The actuator described provides a way of manually driving the actuator that has a very simple mechanical structure for selectively engaging the manual drive shaft. In other words, there is no need for complex additional structures. This increases the robustness of the actuator and simplifies handling and the manufacturing process.

In one embodiment, it is provided that the manual operating element, in the position connected to the housing, forces the manual drive shaft into an engaged position, preferably against a restoring force, along a longitudinal axis of the manual drive shaft.

In particular, the manual operating element, in the position connected to the housing, can force the manual drive shaft from an uncoupled position into an engaged position in which the manual drive shaft is coupled to the gear of the actuator. This is a particularly simple and robust variant of the optional engagement of the manual drive shaft.

In one embodiment, it is provided that a coupling means of the manual drive shaft in one or the engaged position of the manual drive shaft is connected to a coupling means of the gear, preferably directly, in a force-fit and/or form-fit manner.

The coupling means can be, for example, engagement means such as gearwheels and/or friction wheels, which preferably mesh with one another. In this way, the design of the actuator is further simplified.

In one embodiment, it is provided that the manual operating element is rotatably arranged in a receiving element which can be connected to the housing by means of a bayonet catch and/or wherein the manual operating element has one or the receiving element which rotatably engages with the housing.

This makes it easy to mount the manual operating element on the housing. This further simplifies the engagement of the manual drive shaft and the handling of the actuator.

In one embodiment, it is provided that a slipping clutch, in particular a tolerance sleeve, is formed between a coupling point of the housing for the manual operating element and the gear.

In this way, overloading of the manual drive can be avoided even with a low force rating due to manual operation.

In one embodiment, it is provided that the actuator further comprises a coupling element comprising the slipping clutch, in particular one or the tolerance sleeve, for coupling the manual drive element to the manual drive shaft.

In this way, overloading of the manual actuator can be avoided even with a low force rating due to manual operation, without increasing the number of actuator components. This further simplifies the design of the actuator.

In one embodiment, it is provided that the manual drive shaft or a movable coupling element for coupling the manual drive shaft to the gear has a detectable element which interacts with a sensor in order to distinguish the or an engaged position from a disengaged position of the manual drive shaft.

The detectable element can be a permanent magnet, for example, which is monitored by a magnetic field sensor that is arranged in a stationary manner, for example on the housing or built-in control electronics of the actuator. In this way, the engaged position of the manual drive shaft can be detected in a particularly simple manner. Furthermore, the engaged position can be detected and another drive unit for driving the gear can then be deactivated, for example one or the (electric) motor of the actuator. This further simplifies the engagement of the manual drive and the handling of the actuator. In addition, overloading or incorrect loading or stress caused by operating the manual drive and ultimately damage to the other drive unit and/or the actuator can be avoided.

In one embodiment, it is provided that the manual operating element, in particular a manual drive crank, can be attached to the actuator housing.

This results in a particularly compact actuator design.

In one embodiment, it is provided that the actuator further comprises: a sealing ring which is inserted between two housing parts of the actuator housing; and/or a band, in particular a tensioning band, which is arranged at least partially around the housing or a housing part of the actuator; wherein the actuator housing and/or the band has a preferably integrally formed receptacle, in particular a latching receptacle and/or a magnetic receptacle, for the manual operating element.

The latching receptacle is, for example, a latching connection and can be designed in particular as a finger-like projection. The band or tensioning band provides cable bushings for the actuator, for example. In other words, cable bushings of the band or tensioning band can be arranged on the actuator in such a way that they overlap with an opening in the housing of the actuator. In particular, it may be provided that the shape of the manual operating element arranged in or on the receptacle follows the shape of the housing or a housing part. This further improves the compactness of the actuator design.

In one embodiment, it is provided that the actuator further comprises: a cover for one or the coupling point of the housing for the manual operating element.

The manual operating element can be detachably connected to the housing or a housing part of the actuator at the coupling point of the housing. The cover can be placed on the coupling point when the manual operating element is removed to prevent contamination of the coupling point. This further improves the robustness and durability of the actuator.

As a further possibly independent aspect, the solution to the object mentioned at the beginning of an actuator of the type mentioned at the beginning, which comprises a stacked structure arranged in a housing, consists in particular in that the actuator further comprises: a connecting element for connecting the stacked structure to the housing, wherein the connection between the housing and the stacked structure has an axial degree of freedom.

In other words, the connecting element allows a connection between the housing and the stacked structure that has an axial degree of freedom. The axial degree of freedom allows a displacement of the stacked structure relative to the housing in an axial direction, for example in a longitudinal direction of the stacked structure and/or the housing. In other words, the connecting element allows the stacked structure to be extended in an axial direction, in particular a longitudinal direction, of the stacked structure.

The stacked structure can have a plurality of stacked functional units of the actuator. The stacked structure or the individual functional units or the intermediate elements, such as fastening elements or means, which are arranged between the individual functional units, may have different heights during the manufacturing process and/or during use of the stacked structure or the functional units (temporarily, for example due to the effect of heat). In other words, the stacked structure may have a tolerance in its height. Such functional units or elements may include, for example, a drive motor and/or a gear.

The disclosed actuator provides a connection between the housing and the stacked structure, which has an axially displaceable degree of freedom. In this way, a safeguard can be formed in particular against rotations and radial deflections of the stacked structure, which can, however, absorb the tolerances of the stacked structure with regard to its height. This improves the securing of the stacked structure within the housing.

In one embodiment, it is provided that the connecting element laterally connects the stacked structure to the housing, preferably laterally supporting and/or clamping the stacked structure in the housing.

In this way, a stable connection of the stacked structure to the housing can be achieved while ensuring the axial degree of freedom of the connection, for example in the longitudinal direction of the stacked structure and/or the housing. The lateral connection is, for example, a connection in the direction of a transverse axis, in particular a transverse axis perpendicular to the longitudinal axis, of the housing and/or the stacked structure. As a result, (vibrational) movements of the stacked structure relative to the housing can be avoided, reduced or attenuated.

In one embodiment, it is provided that the connecting element is spaced from the stacked structure along the axial degree of freedom, in particular along a longitudinal axis of the stacked structure, and/or that the connecting element contacts the stacked structure along an axis transverse to the axial degree of freedom, in particular along a transverse axis of the stacked structure.

As a result, the connection offers a certain tolerance with regard to the expansion of the stacked structure in the longitudinal direction without allowing an unintentionally large expansion or displacement of the stacked structure in the longitudinal direction.

In one embodiment, it is provided that the actuator further comprises: at least two housing parts, wherein the connecting element is arranged between the two housing parts, in particular wherein the connecting element is a sealing element arranged between the two housing parts.

This results in a particularly simple actuator design and reduces the number of actuator components. This provides a particularly compact and robust actuator.

BRIEF DESCRIPTION OF THE DRAWINGS

The invention is described in more detail below with reference to several preferred exemplary embodiments, wherein.

DETAILED DESCRIPTION

Figure 1:
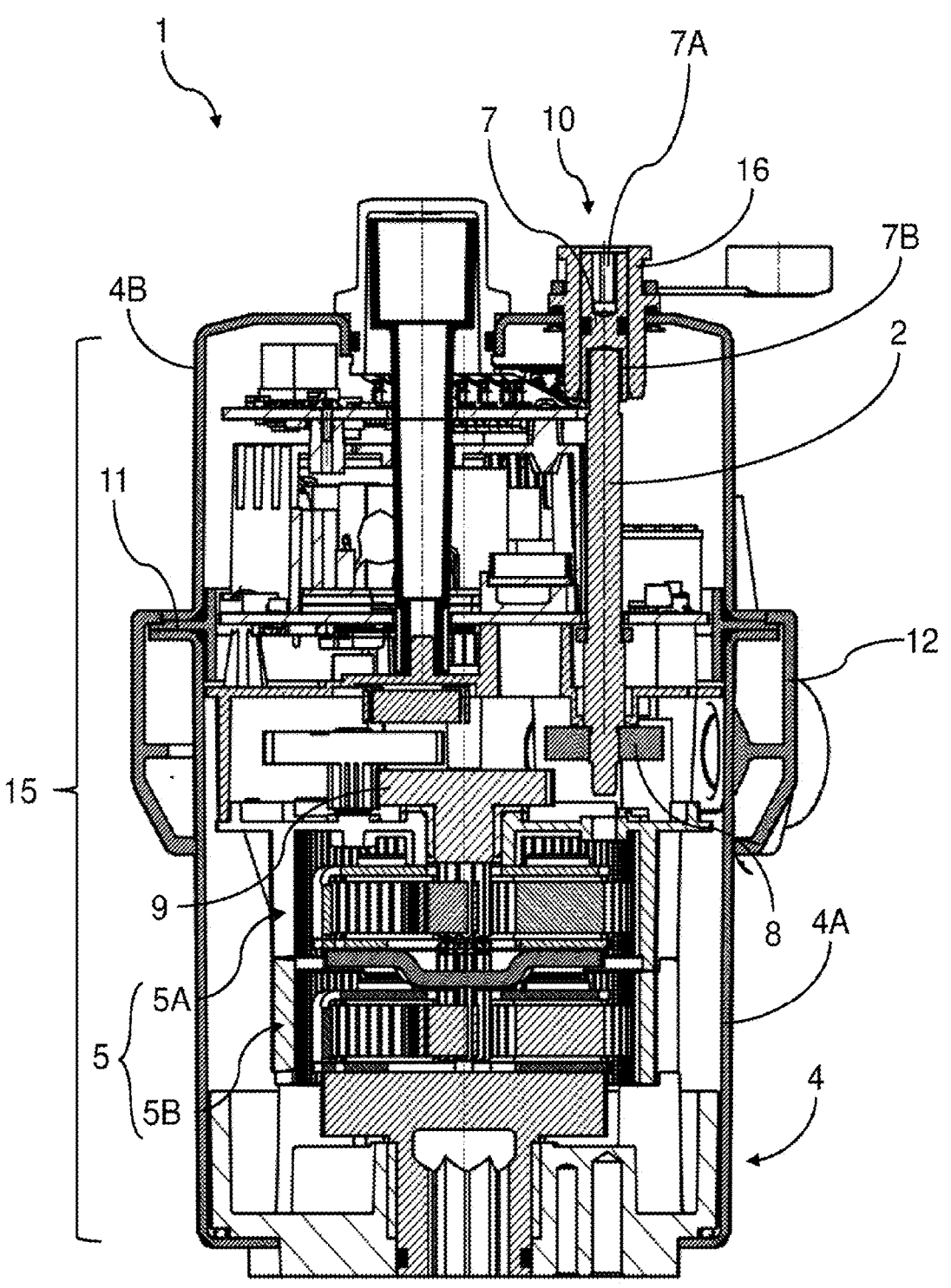
FIG. 1 shows a lateral sectional view of a first actuator with a manual drive shaft in the uncoupled position.

FIG. 1 shows a lateral sectional view of a first actuator 1. The actuator 1 comprises an engageable manual drive shaft 2 for manual drive of the actuator 1. The manual drive shaft 2 can be directly or indirectly engaged or coupled with a gear of the actuator. In the example shown, the gear 5 comprises an upper planetary gear 5A and a lower planetary gear 5B and is used, for example, to position a valve. FIG.

1 shows the manual drive shaft 2 in a decoupled position, i.e. in a position in which the manual drive shaft 2 is not coupled to the gear 5.

The actuator 1 comprises a housing 4. The housing 4 comprises a first, pot-shaped housing part 4A and a second housing part or a housing cover 4B. A sealing element 11 or a sealing ring 11 is fitted between the first and second housing parts 4A, 4B. The sealing element 11 is, for example, a carrier of one or more sealing rings, such as O-rings.

The housing 4 also comprises a coupling point 10 for a manual operating element 3 for detachable connection of the manual operating element 3 to the housing 4, in particular the housing cover 4B. The coupling point 10 can be adapted to the manual operating element 3 or represent a counterpart to the manual operating element 3. Alternatively, the coupling point 10 can be suitable for the detachable connection of conventional manual operating elements, such as hexagonal wrenches, to the housing 4. The coupling point 10 comprises a coupling element 7. The coupling element 7 has a first receptacle 7A that faces outwards, i.e. towards the environment of the actuator 1. The first receptacle 7A is designed to receive the manual operating element 3 or a part or a (coupling) end of the manual operating element in order to connect the manual operating element 3 to the housing 4, in particular to connect it in a force-fit and/or form-fit manner.

The coupling element 7 also has a second receptacle 7B. The second receptacle 7B is directed inwards, i.e. towards the inside of the actuator 1 or the housing 4. The second receptacle 7B is designed, for example, as a slip clutch or a tolerance sleeve. The second receptacle 7B is designed to receive the manual drive shaft 2 or a first end of the manual drive shaft 2. The manual operating element 3 can be connected or coupled to the manual drive shaft 2 via the coupling element 7.

Figure 2:
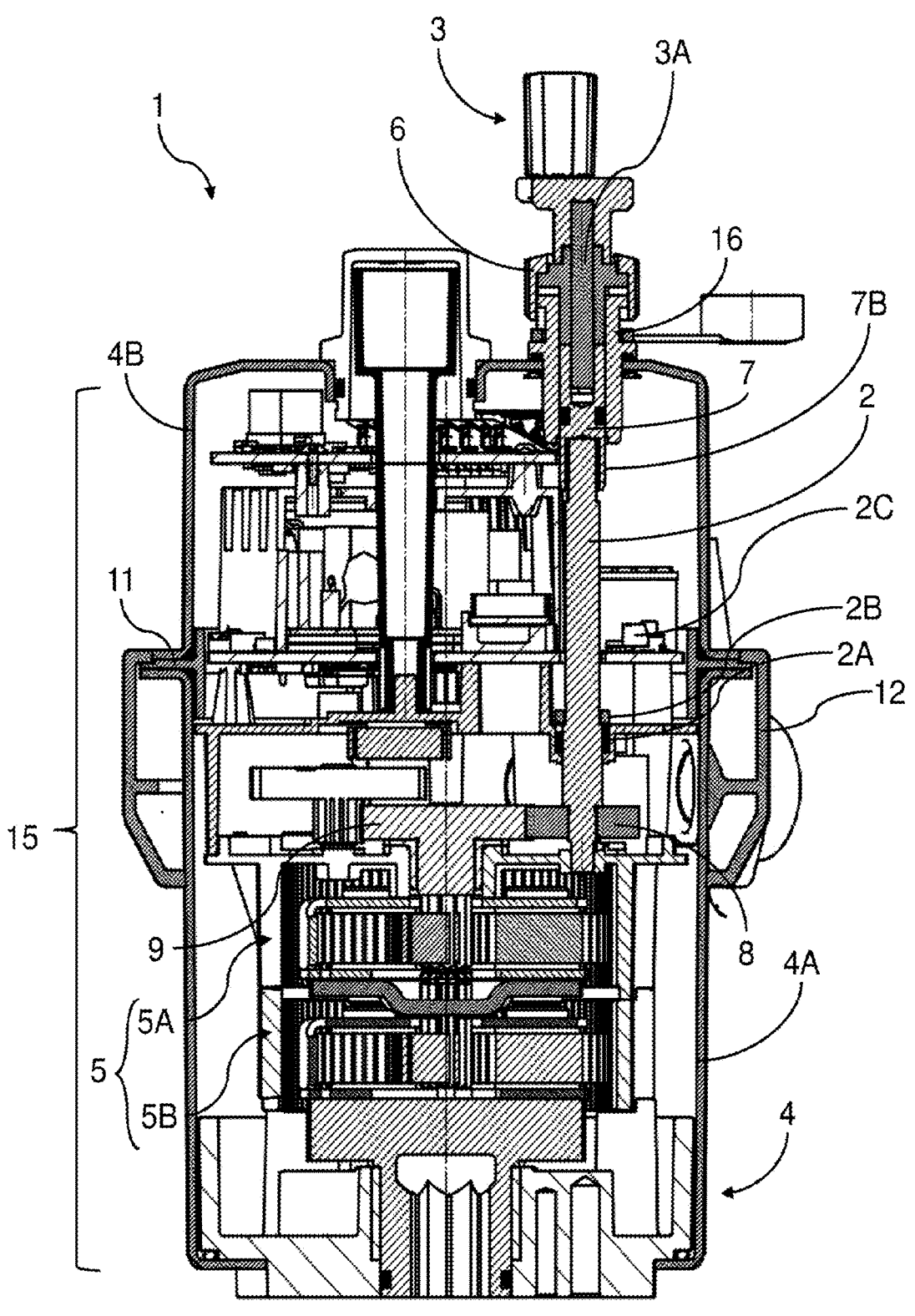
FIG. 2 shows the first actuator in a lateral sectional view with the manual drive shaft in the coupled position.

FIG. 2 shows a side sectional view of the actuator 1 from FIG. 1. Identical or similar features are marked with the same reference signs. FIG. 2 shows the manual drive shaft 2 in a coupled or engaged position, i.e. in a position in which the manual drive shaft 2 is coupled to the gear 5. The manual drive shaft 2 has a coupling means 8. In the coupled position, the coupling means 8 of the manual drive shaft 2 is coupled to a coupling means 9 of the gear 5 or connected in a force-fit or form-fit manner. The coupling means 8 and 9 are, for example, meshing engagement means, such as gearwheels. The coupling means 9 is mounted in the upper planetary gear 5A. The upper planetary gear 5A transmits a force introduced via the coupling means 9 to the lower planetary gear 5B.

As a result of a translational movement of the manual drive shaft 2 along a longitudinal axis of the manual drive shaft 2, the manual drive shaft 2 can be moved, brought or forced from the decoupled position (as shown in FIG. 1) into the coupled position (as shown in FIG. 2). As can be seen in FIG. 2, the connection of the manual operating element 3 to the housing 4 causes or forces the translational movement of the manual drive shaft 2 from the decoupled position to the coupled position. In other words, by inserting a coupling end 3A of the manual operating element 3 into the first receptacle 7A and moving the manual operating element 3 along the longitudinal axis of the manual drive shaft 2 until the manual operating element 3 reaches an engagement or end position on the housing part 4, the translational movement of the manual drive shaft 2 from the decoupled position to the coupled position is forced.

By removing the manual operating element 3 from the first opening 7A, a return spring 2A forces a movement of the manual drive shaft 2 from the coupled position to the uncoupled position. In other words, in a position of the manual operating element 3 not connected to the housing 4, the manual drive shaft 2 is in the decoupled position. In yet other words, by separating or removing the manual operating element 3 from the housing 4, the decoupling of the manual drive shaft 2 from the gear 5 is forced. This is achieved, for example, by a restoring force against which the manual drive shaft 2 is moved from the decoupled position into the coupled position. In addition or alternatively, this is achieved by the force or frictional connection between the coupling end 3A of the manual operating element 3 and the first receptacle 7A.

As shown in FIGS. 1 and 2, the manual operating element 3 comprises a receiving element 6 for form-fit and/or force-fit connection of the manual operating element 3 to the housing 4, more specifically to a correspondingly oppositely configured receiving element 16 of the housing 4. The manual operating element 3 is rotatably arranged in the receiving element 6 of the manual operating element 3. The receiving element 6 engages around the coupling end 3A of the manual operating element 3. The manual operating element 3 can be connected to the housing 4 via the receiving elements 6 and 16 by means of a bayonet catch. In other words, the receiving element 6 of the manual operating element 3 can be rotatably engaged in the receiving element 16 of the housing 4.

The actuator 1 further comprises a sensor and an element 2B detectable by the sensor in order to distinguish the engaged or coupled position of the manual drive shaft 2 from the disengaged or decoupled position of the manual drive shaft 2. For this purpose, a movable coupling element or means for coupling the manual drive shaft 2 to the gear 5 can have the detectable element 2B. The movable coupling element with the detectable element 2B can, for example or alternatively, be the coupling element 7, the manual drive shaft 2 itself or at least one of the coupling means 8 or 9. For example, the sensor detects a translational movement of the detectable element 2B along the longitudinal axis of the manual drive shaft 2. The detectable element 2B can, for example, be a permanent magnet that is mounted next to or near a stationary magnetic field sensor, preferably surrounded by the housing 4 or control electronics 2C. Alternatively or additionally, the actuator may have a different type of detectable element 2B and/or sensor to distinguish the engaged position from the disengaged position.

Figure 3:
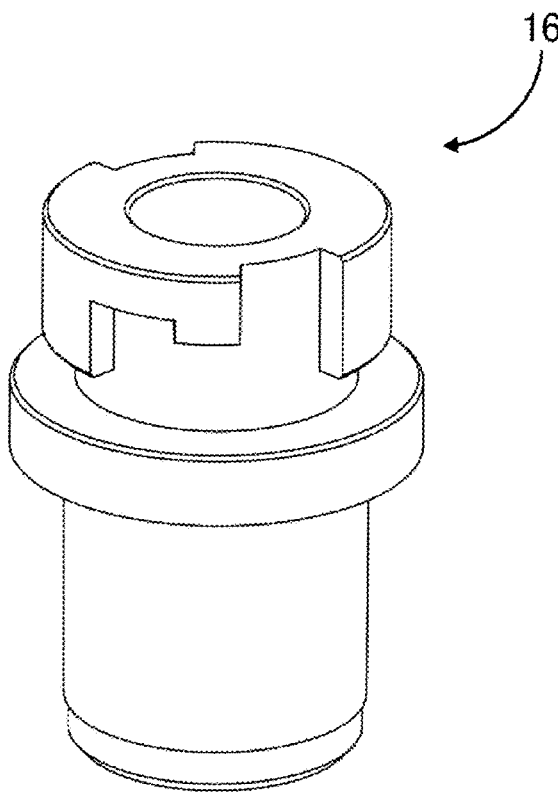
FIG. 3 shows a three-dimensional view of a receiving element of a housing of the actuator.
Figure 4:
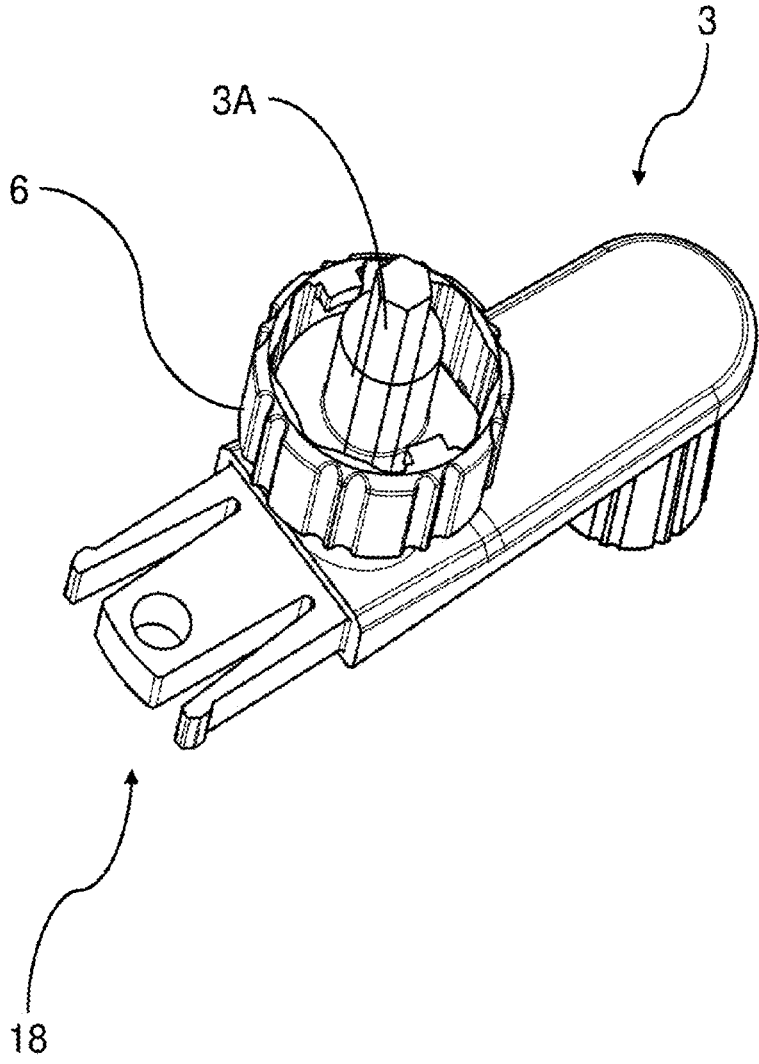
FIG. 4 shows a three-dimensional view of a manual operating element of the actuator.

The receiving element 16 is shown separately in FIG. 3 in a three-dimensional view. The manual operating element 3 is shown separately in FIG. 4 in three-dimensional view. Identical or similar features are marked with the same reference signs.

Figure 5:
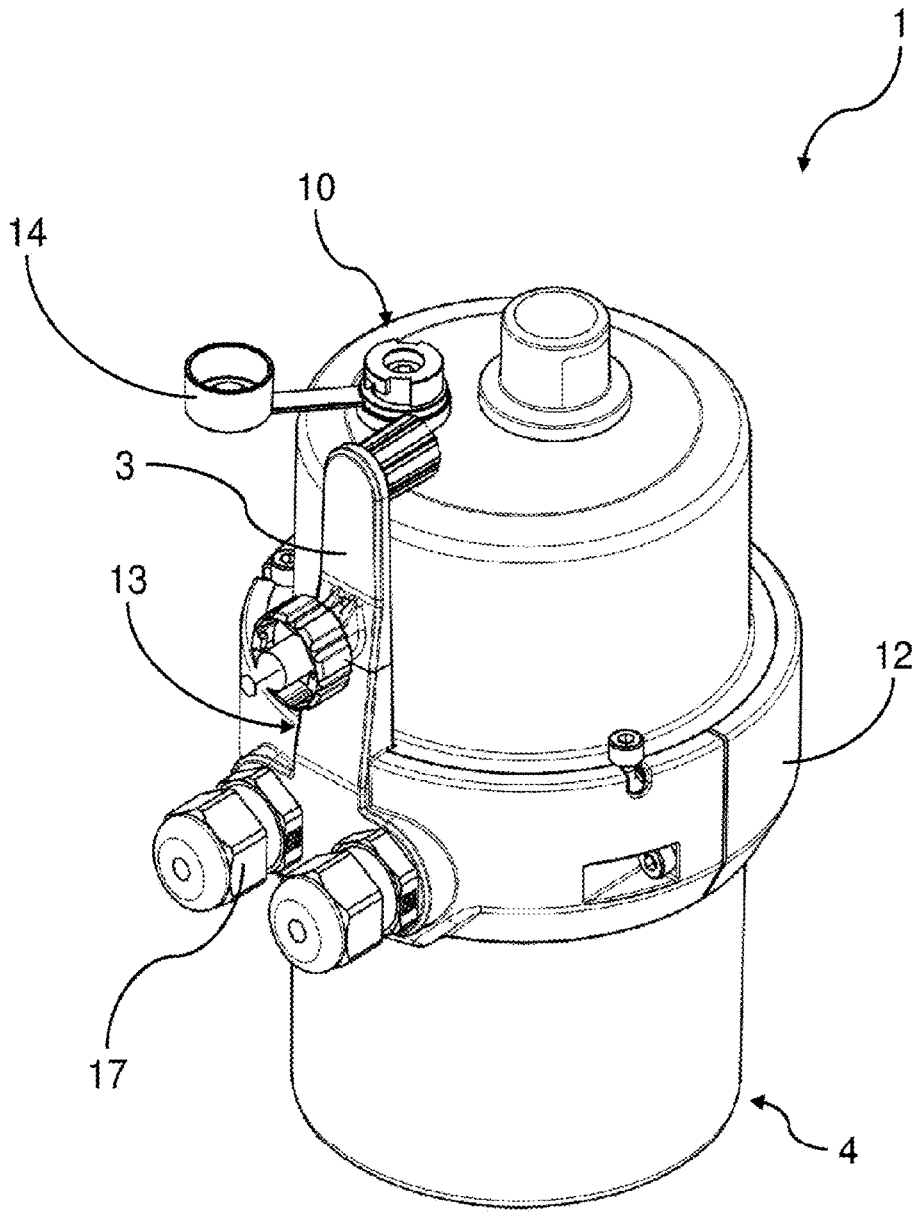
FIG. 5 shows a three-dimensional view of the actuator.

FIG. 5 shows a three-dimensional view of the actuator 1 from FIGS. 1 and 2. Identical or similar features are marked with the same reference signs. As can be clearly seen in FIGS. 4 and 5, the manual operating element 3 is designed as a crank. The manual operating element 3 can be attached to the housing 4 on an outer wall, in this case the outer surface of the housing 4. In the fixed position of the manual operating element 3 on the outer wall of the housing, the manual operating element 3 is not connected to the housing 4 for coupling the manual drive shaft 2 to the gear 5. In other words, the fixed position of the manual operating element 3 is different from the connected position of the manual operating element 3 described above. For example, the sealing ring 11, which is arranged between the two housing parts 4A and 4B of the housing, comprises a receptacle 13 for the manual operating element 3 for fixing or mounting the manual operating element 3 to the housing 4.

Alternatively or additionally, the actuator 1 can have a tensioning band 12, as shown in FIG. 5. In the example shown, the tensioning band 12 comprises cable bushings 17 for feeding connecting cables into the interior of the housing 4. For this purpose, the housing 4 can have an opening that at least partially overlaps with the openings of the cable bushings 17. Like the sealing ring, the tensioning band 12 can also have a receptacle 13 for the manual operating element 3.

The manual operating element 3 has engagement means 18 (see FIG. 4), which engage in the receptacle 13 or can be received by it. In this way, the manual operating element 13 can be arranged on the housing 4 or attached to it to save space when the manual operating element 3 is not in use for manual operation of the actuator 1. The engagement means 18 enclose an opening. The manual operating element 3 can be attached to the opening for storage, for example on a bunch of keys.

In addition or alternatively, the manual operating element 3 can comprise a first magnetic element and/or ferromagnetic element that interacts with a second magnetic element and/or ferromagnetic element on the housing 4, the sealing ring 11 and/or the tensioning band 12 in order to fasten the manual operating element 3 to the housing 4.

In the described unconnected state of the manual operating element 13 with the housing 4, a cover 14, preferably attached to the housing 4, can cover the coupling point 10, in particular the receiving element 16, of the housing 4 for the manual operating element 3.

As shown in FIGS. 1 and 2, the actuator 1 comprises a stacked structure 15. The stacked structure 15 comprises one or more functional units of the actuator 1. The functional units comprise, for example, a drive motor and/or one or more gears of the actuator 1. For secure and fixed arrangement of the stacked structure 15 within the housing 4 or for connection of the stacked structure to the housing 4, the actuator 1 comprises a connecting element. The connecting element is, for example, the sealing element 11 described above and/or is comprised by it.

Figure 6:
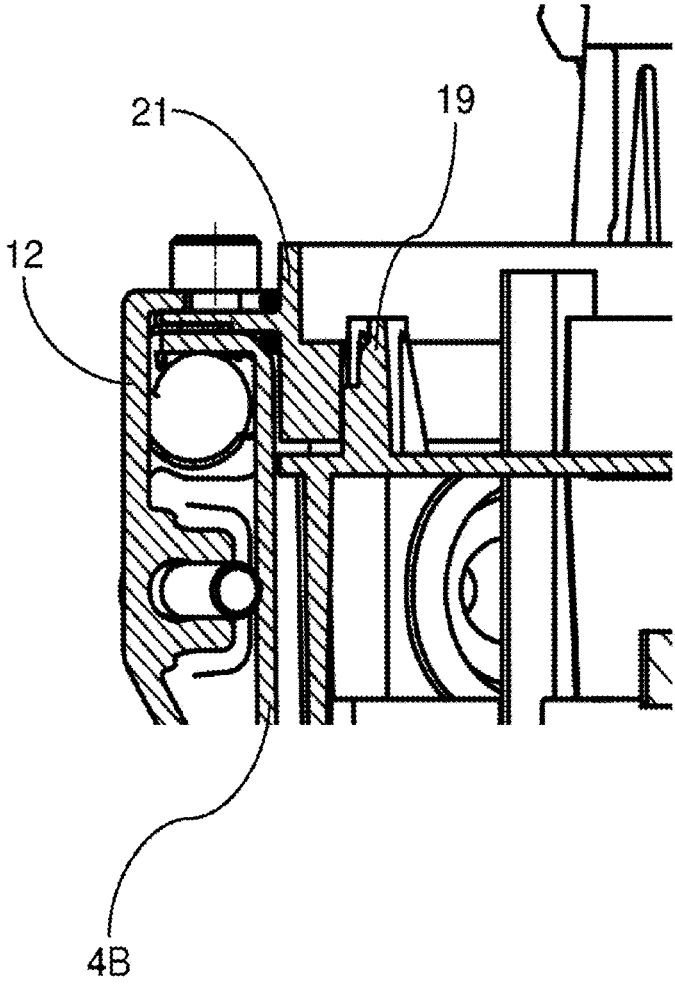
FIG. 6 shows a section of a cross-section of a second actuator similar to the first actuator.

FIG. 6 shows a section of a cross-section of a second actuator 20 similar to the first actuator 1 shown in FIGS. 1 and 2. Identical or similar features are marked with the same reference signs. FIG. 6 further shows a stacking structure element 19 as part of a stacking structure 15 arranged in the illustrated actuator. The stacking structure element 19 cooperates with a connecting element 21, which may comprise or be comprised by the sealing element 11, to connect the stacking structure 15 to the housing 4. The connecting element 21 may correspond to the sealing element 11 or may be a second sealing element. As shown, the connecting element 21 and the stacked structure element 19 are connected to one another laterally, i.e. in a transverse direction to the stacked structure and/or to the housing 4, in particular by means of a positive or non-positive connection.

As can be seen from FIG. 6, the stacked structure 15 or the stacked structure element 19 is spaced apart from the connecting element 21, in the longitudinal direction of the stacked structure 15, wherein the stacked structure element 19 and connecting element 21 are connected or contact each other in the transverse direction of the stacked structure 15. In other words, the connection of the stacked structure 15 to the housing 4 has an axial degree of freedom, in this case in the longitudinal direction of the stacked structure 15. In other words, the connecting element 21 is configured to connect the housing 4 to a stacked structure 15 of varying height. In this way, deviations in the extension of the stacked structure 15 in the direction of the axial degree of freedom, or in this case in the longitudinal direction of the stacked structure 15, which may occur during manufacture and/or operation of the stacked structure, can be tolerated or taken into account.

LIST OF REFERENCE SIGNS

1 First actuator
2 Manual drive shaft
2A Return spring
2B Detectable element
2C Control electronics
3 Manual operating element
3A Coupling end of the manual operating element
4 Housing
4A First housing part
4B Second housing part
Gear of the first actuator
5A Upper planetary gear
5B Lower planetary gear
6 Receiving element of the manual operating element
7 Coupling element
7A First receptacle of the coupling element
7B Second receptacle of the coupling element
8 Coupling means of the manual drive shaft
9 Coupling means of the gear
10 Coupling point of the housing
11 Sealing element
12 Tensioning band
13 Receptacle of the tensioning band
14 Cover
15 Stacked structure
16 Receiving element of the housing 17 Cable bushings of the tensioning band
18 Engagement means of the manual operating device
19 Stacking structure element
20 Second actuator
21 Connecting or second sealing element

The invention claimed is:

1. An actuator (1) comprising:
   a housing (4), a gear (5), an engageable manual drive shaft (2) for a manual drive, and a manual operating element (3),
   wherein the manual operating element (3) is detachably connected to the housing (4), and
   wherein the manual operating element (3), in a position connected to the housing (4), forces a direct or indirect coupling of the manual drive shaft (2) to the gear (5) and forces the manual drive shaft (2) against a restoring force into an engaged position along a longitudinal axis of the manual drive shaft (2), the manual operating element (3) is rotatably arranged in a receiving element (6), wherein the receiving element (6) is connectable to the housing (4) by a bayonet catch, by which the receiving element (6) rotatably engages with the housing (4).

2. The actuator (1) according to claim 1, wherein the manual operating element (3), in the position connected to the housing (4), is coupled directly or indirectly to the manual drive shaft (2).

3. The actuator (1) according to claim 1, further comprising a coupling (8) of the manual drive shaft (2) in the engaged position of the manual drive shaft (2) is connected to a coupling (9) of the gear (5), in at least one of a force-fit or form-fit manner.

4. The actuator (1) according to claim 1, further comprising a slipping clutch (7B) formed between a coupling point (10) of the housing (4) for the manual operating element (3) and the gear (5).

5. The actuator (1) according to claim 1, further comprising a coupling element (7) comprising a slipping clutch (7B) for coupling the manual drive element (3) to the manual drive shaft (2).

6. The actuator (1) according to claim 1, wherein the manual drive shaft (2) or a movable coupling element for coupling the manual drive shaft (2) to the gear (5) has a detectable element which interacts with a sensor in order to distinguish the engaged position from a disengaged position of the manual drive shaft (2).

7. The actuator (1) according to claim 1, wherein the manual operating element (3) is attachable to the actuator housing (4).

8. The actuator (1) according to claim 1, further comprising:

a sealing ring (11) inserted between two housing parts (4A, 4B) of the actuator housing (4); and a band (12) arranged at least partially around the housing (4) or one of the two housing parts (4A, 4B) of the actuator (1); and wherein at least one of the actuator housing (4) or the band (12) has a receptacle (13) for the manual operating element (3).

9. The actuator (1) according to claim 1, further comprising a cover (14) for a coupling point (10) of the housing (4) for the manual operating element (3).

10. The actuator (20) according to claim 1, further comprising, a stacked structure (15) arranged in the housing (4) and a connecting element (21) for connecting the stacked structure (15) to the housing (4), and a connection between the housing (4) and the stacked structure (15) has an axial degree of freedom.

11. The actuator (20) according to claim 10, wherein the connecting element (21) connects the stacked structure (15) to the housing (4) along a transverse axis perpendicular to a longitudinal axis of at least one of the housing or the stacked structure, at least one of supporting or clamping the stacked structure (15) in the housing (4) along the transverse axis.

12. The actuator (20) according to claim 10, wherein the connecting element (21) is spaced from the stacked structure (15) along the axial degree of freedom.

13. The actuator (20) according to claim 10, further comprising at least two housing parts (4A, 4B), the connecting element (21) is arranged between the two housing parts (4A, 4B), and the connecting element (21) comprises a sealing element (11) arranged between the two housing parts (4A, 4B).

* * * * *